H. M. HALE.
DIRIGIBLE HEADLIGHT.
APPLICATION FILED APR. 6, 1920.
1,384,560.
Patented July 12, 1921.
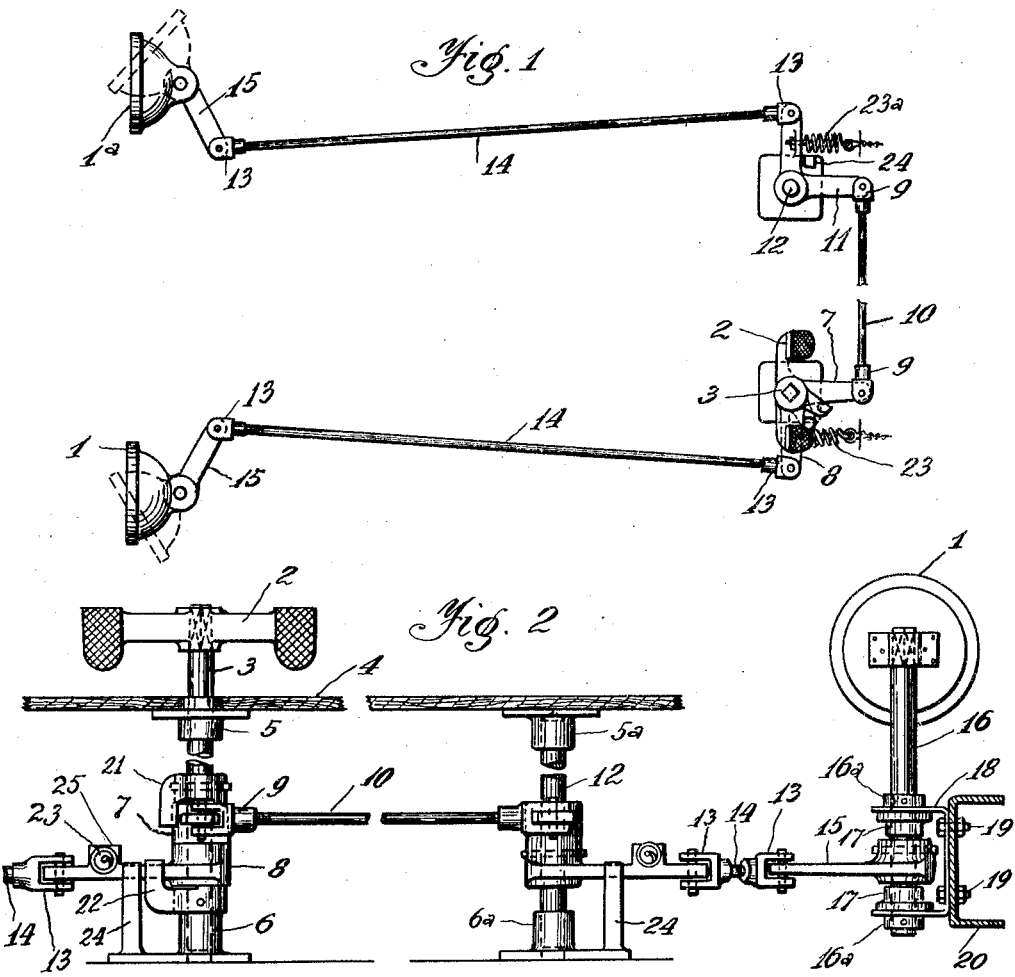

UNITED STATES PATENT OFFICE.

HARRY M. HALE, OF DUQUESNE, PENNSYLVANIA.

DIRIGIBLE HEADLIGHT.

1,384,560.  Specification of Letters Patent.  Patented July 12, 1921.

Application filed April 6, 1920. Serial No. 371,732.

*To all whom it may concern:*

Be it known that I, HARRY M. HALE, a citizen of the United States, residing at Duquesne, in the county of Allegheny and State of Pennsylvania, have invented certain new and useful Improvements in Dirigible Headlights, of which the following is a specification.

This invention relates to dirigible headlights and more especially to dirigible headlights adapted for use in connection with an automobile.

One of the main objects of the invention is to provide a device of simple and inexpensive construction which may be readily applied to an automobile for the purpose of indicating during darkness to the public the direction which the automobile is about to take when making a curve. Another object is to enable the driver of an automobile to ascertain the kind and condition of road he is about to turn into in the darkness thereby eliminating or decreasing the chances of mishaps. A further object of the invention is to provide means which will enable the driver of an automobile to attain the aforesaid objects without either the use or special motions of his hands. Further objects and advantages of the invention will appear from the following detailed description.

In the drawings:—

Figure 1 is a plan view of my preferred construction showing the method of operating the head-lights of an automobile.

Fig. 2 is an enlarged front elevation showing the operating mechanism with the left hand side head-light omitted.

Referring to Figs. 1 and 2, the right and left hand head-lights 1 and 1$^a$ will be swung about in the position indicated by the dotted lines by exerting with the foot a pressure on the left hand side pedal of operating lever 2 securely positioned on the upper end of a rotatably mounted spindle 3 extending above the floor 4 of an automobile body and guided by upper and lower bearings 5 and 6 respectively. Two levers 7 and 8 are loosely mounted upon spindle 3; the upper lever 7 being connected through clevises 9 and rod 10 to a bell-crank lever 11 securely mounted on rotatable vertical spindle 12, guided by bearings 5$^a$ and 6$^a$.

The lower lever 8 is likewise connected to one of the head-light posts through clevises 13, rod 14 and lever 15 secured on lamp-post 16 which is rotatably guided in bearings 17 positioned on a special bracket 18 secured by bolts 19 to the usual frame 20 of an automobile chassis. Two collars 16$^a$ are also securely adjusted on lamp post 16 to prevent same from being rattled up and down while running. The rotative angular motion imparted to the spindle 3 by the pressure of the foot on either pedal is transmitted to the corresponding lever 7 or 8 by means of two dogs 21 and 22 securely mounted upon the spindle 3. Dog 21 is bent downwardly and acts upon the left hand side of the lever 7; whereas the lower dog 22 is bent upwardly and plays upon lever 8 in the opposite direction to that of dog 21. Suitable coil springs 23 and 23$^a$ and stop lugs 24 are provided to restore the whole mechanism into its normal position after the foot pressure on the pedal has been released. As shown in Figs. 1 and 2 the stop lugs are preferably cast directly upon the base of bearings 6 and 6$^a$.

The stationary end of the coil springs may be secured in any well known manner to a suitable part of the automobile body, while the movable end of said springs is adjustably secured to lugs 25 cast on levers 8 and 11.

Assuming that the driver desires to turn about to the right, he will first manifest his intention to the public by exerting a pressure with his foot on the right hand pedal of operating lever 2, thereby causing dog 21 to engage against the back of lever 7 and forcing it to turn around an equal angular amount as the pedal. This motion will be transmitted by the various levers and rods shown in Fig. 1 to right hand head-light 1$^a$ which will then occupy the position designated by the dotted lines. The public will hence be warned in advance of the intention of the driver, who in turn will be enabled to survey the road prior to entering it.

It will be noted that a pressure on the right hand pedal only affects the right hand head-light. This is due to the fact that the lower dog 22 will move away from lever 8, connected with the left hand head-light.

Similarly, when the left pedal is acted on, the upper dog is moved away from lever 7 and lower dog 22 is pressed against lever 8 thus transmitting the motion to head-light 1 and causing it to take the position shown by the dotted lines, the other head-light being kept in its normal or straight-forward position by the action of spring 23ª and stop lug 24.

As will be understood, there may be changes made in details of construction and arrangement of parts of the invention without departing from the field and purpose of the same, and I intend to include all such variations as fall within the scope of the appended claims, in this application in which the preferred forms only of my invention have been disclosed.

What I claim is:—

1. In combination with dirigible headlights of the character described, a rotatably mounted vertical spindle; a plurality of levers loosely positioned upon said spindle and individually acted upon by dogs secured upon said spindle; an operating lever mounted securely on the upper end of said spindle and provided with diametrically disposed pedals, and means for transmitting the motions of said loosely positioned levers to said dirigible headlights.

2. In a device of the character described, the combination of a plurality of headlights mounted upon rotatable individual supports; a radial lever securely mounted upon each of said supports; a rotatably mounted vertical spindle; a plurality of levers loosely positioned upon said spindle and individually acted upon by dogs secured upon said spindle; an operating lever mounted securely on the upper end of said spindle and provided with diametrically disposed pedals; means for transmitting the motions of said loosely positioned levers to said headlights and resilient means for returning said headlights into normal position.

In testimony whereof I affix my signature.

HARRY M. HALE.